UNITED STATES PATENT OFFICE.

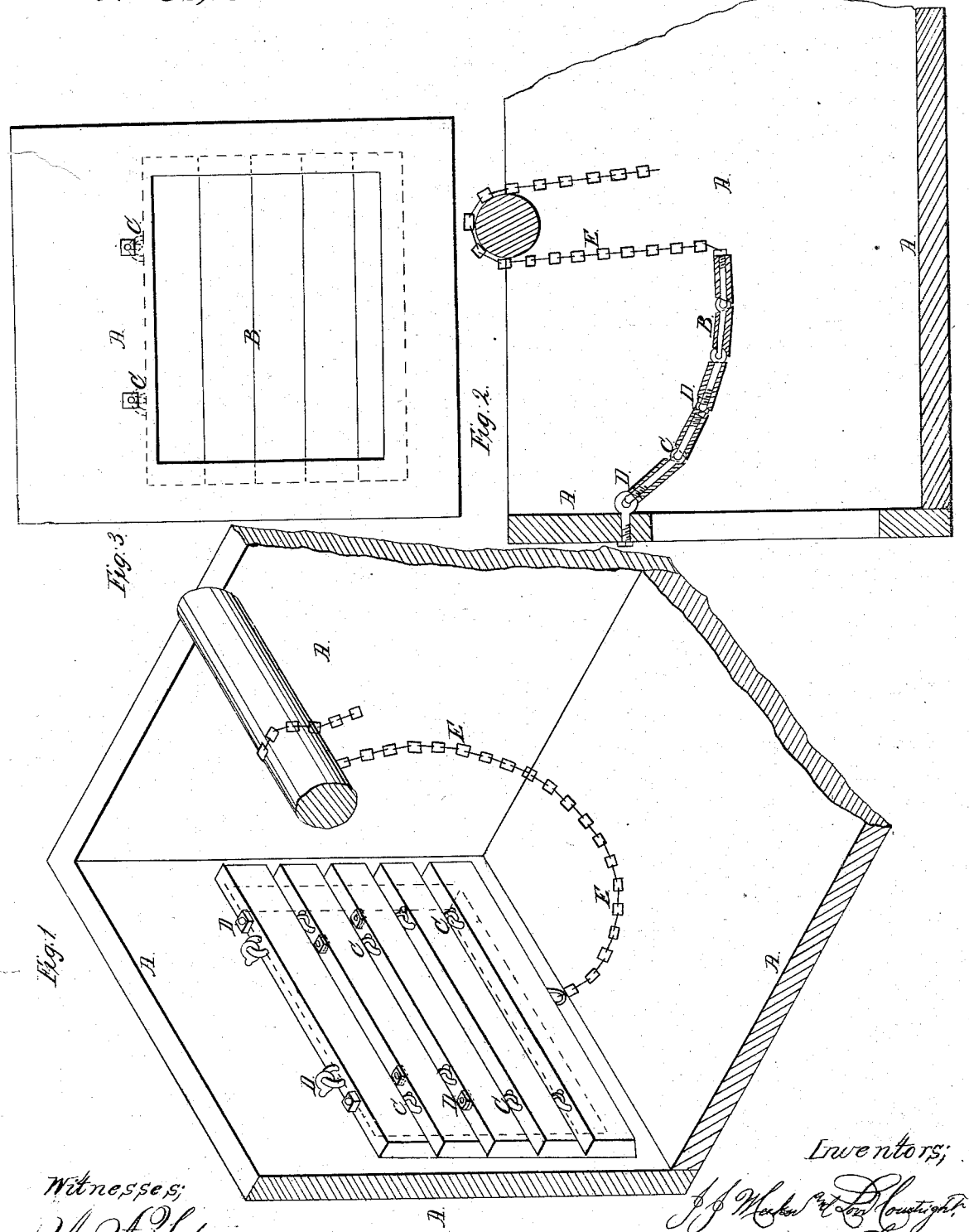

J. J. MEEKER AND LEVI CORTRIGHT, OF COLUMBIA COUNTY, PA.

IMPROVED GATE FOR FOREBAYS, &c.

Specification forming part of Letters Patent No. 55,882, dated June 26, 1866.

*To all whom it may concern:*

Be it known that we, JAMES J. MEEKER and LEVI CORTRIGHT, of Columbia (late of Luzerne) county, in the State of Pennsylvania, have invented certain new and useful Improvements in Gates for Forebays of Mills and for other similar purposes; and we do hereby declare that the following is a full and exact description thereof, reference being had to the accompanying drawings, and to the letters of reference thereon marked.

Figure 1 is a view showing the gate as it appears when closed. Fig. 2 is a vertical section through the gate and forebay. Fig. 3 is an elevation of one side of the gate.

To enable those skilled in the art to make and use our invention, we will describe its construction and operation.

Our invention consists in making the gates used for flood-gates of mills, wheels, forebays, and the like out of several slabs or lags hinged closely to each other, so as to form a flexible gate, which is to be hinged at its upper edge to the front of the race or chute, and to be operated by any of the common devices, as will more fully hereinafter appear.

A represents the chute; B, the gate, which is composed of two, three, or more stout planks fastened edge to edge, as shown, by means of staples or hinges, so that the several planks or lags shall all be in the same plane and flush when the gate is closed. The adjoining edges of the several lags are properly beveled off, so as to allow them to bend over, as shown in Fig. 2.

C are staples or eyebolts by which the several lags are fastened to each other, and by which the upper lag is fastened to the front of the chute.

D are square nuts on the ends of the bolts, countersunk, so that by turning up the nuts the lags can be drawn water-tight together.

E is a chain fastened to the lower edge of the lowest lag for the purpose of opening the gate. We do not limit ourselves to the use of a chain as the means of operating our gate. A suitable arrangement of levers will answer as well.

Experience with other gates and with our gate has proven that this flexible gate operates more easily and satisfactorily. If the gate were made of one solid plank hinged to the front of the forebay or chute the pressure of the water would be so great that it would be almost impossible to pull open the gate, because the whole pressure of the water has to be overcome at once; but by making the gate flexible—in, say, ten pieces—only one-tenth of the whole pressure has to be overcome at any instant, for as soon as the first lag is open the water will flow through the opening, so as to take off the pressure from that lag, thus leaving the same one-tenth of power to open the next and other lags in like manner. The pressure of water upon the upper unopened lags is sufficient to promptly close the gate without slamming when the chain is slackened.

By our invention we have made a cheap, simple, and effective gate, not surpassed or equaled by any known to us.

Having thus fully described our invention, what we claim as new, and desire to secure by Letters Patent, is—

The flexible gate B, constructed and operating substantially as and for the purposes set forth.

JAMES J. MEEKER.
LEVI CORTRIGHT.

Witnesses to signature of James J. Meeker:
 JO. C. CLAYTON,
 V. C. CLAYTON.

Witnesses to signature of Levi Cortright:
 JOHN L. HOSLER,
 S. E. LYNN.